United States Patent [19]
Grunze

[11] Patent Number: 5,441,351
[45] Date of Patent: Aug. 15, 1995

[54] FULL COMPLEMENT SELF-ALIGNING ROLLER BEARING

[75] Inventor: Mark R. Grunze, Naperville, Ill.

[73] Assignee: Rexnord Corporation, Milwaukee, Wis.

[21] Appl. No.: 142,188

[22] Filed: Oct. 26, 1993

[51] Int. Cl.⁶ .................... F16C 33/36; F16C 19/50
[52] U.S. Cl. ................................ 384/568; 384/450
[58] Field of Search ................ 384/450, 558, 568

[56] References Cited

U.S. PATENT DOCUMENTS

| | | |
|---|---|---|
| 1,376,310 | 4/1921 | Armstrong . |
| 2,387,962 | 10/1945 | Williams . |
| 2,767,037 | 10/1956 | Williams . |
| 3,912,346 | 10/1975 | Boratynski et al. . |
| 3,930,693 | 1/1976 | Bowen . |
| 3,938,865 | 2/1976 | Rouverol . |
| 4,120,542 | 10/1978 | Bhateja et al. . |
| 4,138,170 | 2/1979 | Markfelder et al. . |
| 4,398,777 | 8/1983 | Murphy . |
| 4,492,415 | 1/1985 | Baile et al. ................ 384/463 |
| 4,557,613 | 12/1985 | Tallian et al. ............. 384/568 |
| 4,705,411 | 11/1987 | Kellstrom ................. 384/450 |
| 5,037,214 | 8/1991 | Dougherty ................ 384/571 |
| 5,074,680 | 12/1991 | Hoch et al. ............... 384/560 |

FOREIGN PATENT DOCUMENTS

| | | |
|---|---|---|
| 189365 | 7/1986 | European Pat. Off. . |
| 359464 | 9/1922 | Germany . |
| 188617 | 9/1985 | Japan . |
| 186120 | 7/1990 | Japan ........................ 384/450 |
| 747314 | 4/1956 | United Kingdom . |
| 91/05174 | 4/1991 | WIPO ......................... 384/558 |

Primary Examiner—Thomas R. Hannon
Attorney, Agent, or Firm—Michael, Best & Friedrich

[57] ABSTRACT

A retainerless self-aligning angular contact antifriction bearing apparatus including an inner race member having a spheroidal inner race surface, an outer race member including a pair of convex outer race surfaces opposing the inner race surface, and a plurality of rollers arranged in axially oppositely inclined rows. Each roller includes a concave longitudinal profile having a radius of curvature greater than the radius of curvature of each of the spheroidal inner race surface and the associated convex outer race surface.

11 Claims, 1 Drawing Sheet

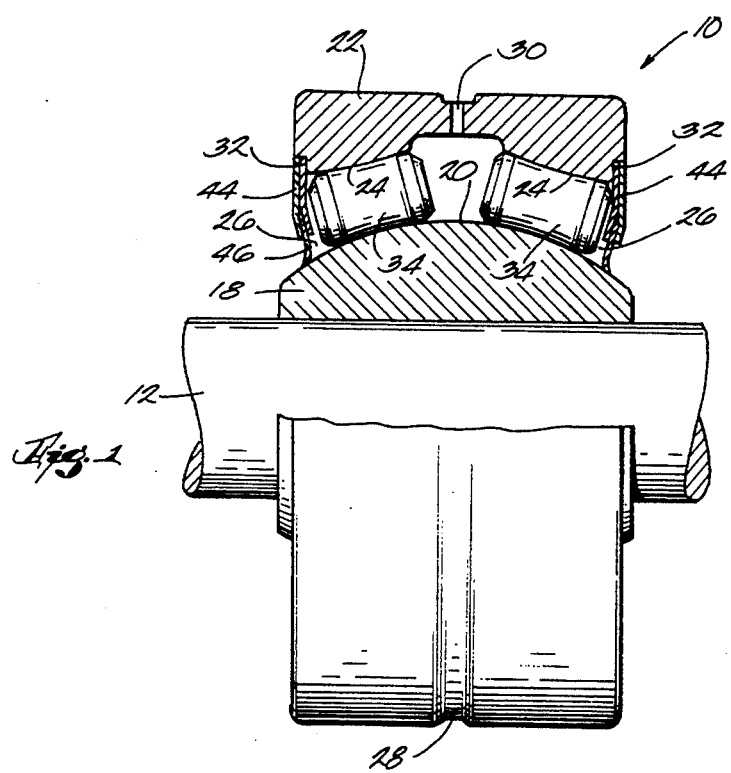
Fig. 1
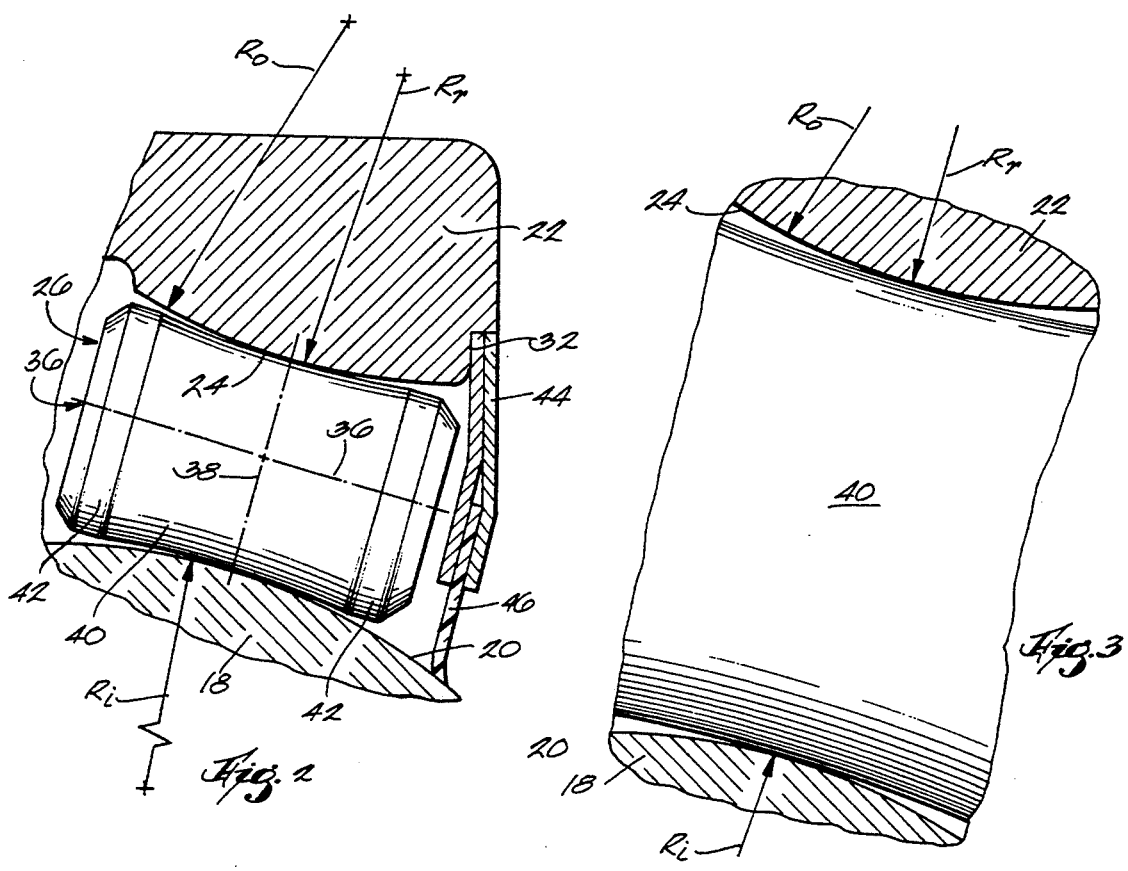
Fig. 2
Fig. 3

FULL COMPLEMENT SELF-ALIGNING ROLLER BEARING

BACKGROUND OF THE INVENTION

1. Field of the Invention

The invention relates generally to roller bearings, and more particularly to roller bearings for use in rotary or oscillatory applications, such as for supporting rotating or oscillating shafts.

2. Reference to Prior Art

Known roller bearings include various means for guiding and positioning rollers. For example, self-aligning angular contact roller bearings are shown in U.S. Pat. No. 2,387,962 issued Oct. 30, 1945 and U.S. Pat. No. 2,767,037 issued Oct. 16, 1956. In each of those patents the illustrated roller bearing includes an inner ring that provides a substantially spherical inner race surface, a pair of outer race surfaces having convex curvatures, and a pair of oppositely inclined rows of symmetrical hourglass-shaped rollers. Those roller bearings also include bearing cages or retainers to separate, guide and position the rollers in each row. An example of the above-described roller bearing is produced by Rexnord Corporation, Bearing Operation, Downers Grove, Ill. and has a Model No. DAS4-14A.

Japanese Patent No. 60-188617 illustrates a roller bearing having opposite rows of asymmetrical rollers and a center guide ring. The shape of the rollers and the center guide ring operate to guide and position the rollers in each row.

It is also known to provide integral collars or shoulders on the inner ring or the outer ring of a roller bearing to guide the rollers. An example of such a roller bearing is illustrated in U.S. Pat. No. 3,912,346 issued Oct. 14, 1975. In that roller bearing, an inner ring is provided with radially extending integral collars between which the rollers are confined.

The loads exerted on a bearing unit such as those described above are typically carried by the rollers in only one part of the unit at a time, that part being referred to as the "load zone". Especially where bearings are used in oscillatory applications, such as in aircraft flight control surfaces, it is desired that the rollers precess or index so that they are all cycled through the load zone. Cycling the rollers results in utilization of the entire race surface of each of the rollers to extend rolling contact fatigue life. Cycling the rollers also redistributes grease for improved lubrication of the bearing unit which in turn reduces fretting damage and improves the bearing unit's resistance to raceway corrosion. To cause such precessing or indexing of the rollers, it is known to use a retainer with skewed pockets. A known retainer has fingers or prongs inclined slightly to provide an inbalanced amount of skew to the rollers which causes the rollers to precess or index during oscillation of the bearing.

A disadvantage associated with the foregoing roller bearing units is the inclusion of a bearing cage, retainer, guide ring, integral collar, or the like. Such components are costly to produce and assemble as part of the bearing unit. Those components also occupy space within the bearing unit that could otherwise be used for additional rollers and/or additional lubricant.

SUMMARY OF THE INVENTION

The invention provides an improved roller bearing apparatus particularly suited for oscillatory or slow rotation service. The roller bearing apparatus does away with the roller retainer, guide ring or integral collar present in prior art arrangements without significantly adversely affecting the operating characteristics of the bearing. By omitting those components the roller bearing apparatus can be produced more economically. Also, the lack of a retainer permits the bearing apparatus to accept an increased number of rollers so that the load is distributed among more rollers occupying the load zone. Accordingly, a bearing embodying the invention can have a higher load bearing capacity than a prior art bearing that is of similar size and that includes a bearing retainer. The absence of a retainer, guide ring or integral collar also leaves space for additional lubricant, if desired.

Applicant has discovered that, surprisingly, adequate bearing performance can be achieved in a roller bearing apparatus including hourglass-shaped or barrel-shaped rollers supported or guided only by the primary race surfaces (i.e., those surfaces carrying the applied load on the bearing) of the bearing apparatus. For example, adequate performance is achieved in bearing units such as the aforementioned Model No. DAS4-14A when the retainer is removed therefrom. That performance includes not only the ability of the resulting bearing to include additional rollers filling the space formerly occupied by the retainer, but also adequate roller skew control and the ability of the rollers to precess or index.

More specifically, roller skew control is achieved at the interface of the inner or outer race surface(s) and the rollers. In one embodiment, roller skew control is accomplished by varying degrees of contact between a convex outer race surface having a radius of curvature that is less than the radius of curvature of an hourglass-shaped roller. That contact, under static, no load conditions when the roller is not skewed, is substantially point contact at about the midpoint of the roller. Under oscillatory or rotational no load conditions, roller/outer race surface contact extends axially outwardly of the roller midpoint as roller skew occurs. As roller skew increases that contact eventually reaches the ends of the hourglass-shaped rollers, which ends restrict any further skewing. A similar action occurs when the rollers are placed under load.

Additionally, Applicant has observed that the bearing apparatus embodying the invention precesses or indexes to cycle the rollers through the load zone. While observed roller precession was less regular than can be achieved with the use of a retainer having skewed pockets, the degree of precession or indexing over time is believed to be sufficient to achieve acceptable cycling of the rollers through the load zone. Although the reason for this precessing of indexing is not fully understood, it is theorized that it may be affected by cumulative differentials in slip between individual rollers (i.e., overall tendency of individual roller to roll in one direction more readily than in the other direction due to imperfections in the roller) and/or by the osculation in the bearing apparatus.

In particular, the invention provides a retainerless bearing apparatus including an inner ring member having an arcuate inner race surface, an outer ring member having an arcuate outer race surface, and a row of rollers in the raceway space defined between the inner and outer race surfaces. Since the bearing apparatus is retainerless each roller is engageable with the rollers on its opposite sides, and the outer race surfaces function as the sole means for limiting skew whereas both the inner race and the outer race position and hold the rollers within the raceway space.

In one embodiment, the retainerless bearing apparatus includes an inner race member having a spheroidal inner race surface, and an outer race member having a convex outer race surface opposing the inner race surface. The bearing apparatus also includes a plurality of rollers arranged in a row in the raceway space between the inner and outer race surfaces. Each of the rollers includes a concave longitudinal profile (i.e., is hourglass-shaped) having a radius of curvature that is somewhat greater than the radius of curvature of each of the convex outer race surface and the spheroidal inner race surface. Applicant has discovered that this geometric relationship between the rollers and the race surfaces provides sufficient roller skew control for the bearing to operate adequately without a retainer, guide ring, collar, or other means apart from the primary race surfaces for holding, positioning or guiding rollers. Further, Applicant has discovered that the foregoing bearing apparatus displays precession action, albeit somewhat inconsistent, to cycle rollers through the load zone.

Various other features and advantages of the invention will become apparent to those skilled in the art upon review of the following detailed description, claims and drawings.

BRIEF DESCRIPTION OF THE DRAWINGS

FIG. 1 is a side elevational view, partially broken away and in section, of a roller bearing apparatus shown supporting a shaft.

FIG. 2 is an enlarged view of a portion of the bearing apparatus illustrated in FIG. 1, and showing the roller depicted therein under loaded conditions.

FIG. 3 is a further enlarged view of part of the bearing apparatus portion illustrated in FIG. 2, and showing the roller in a no load condition wherein the line of contact between the roller and the race surfaces is substantially reduced.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Illustrated in FIG. 1 is a roller bearing apparatus 10 which embodies the invention and which is shown supporting a rotating or oscillating shaft 12. In the particular embodiment illustrated in the drawings, the bearing apparatus 10 is an angular contact internally self-aligning bearing.

The bearing apparatus 10 comprises an annular inner race or ring member 18 through which the shaft 12 extends. The inner ring member 18 includes an arcuate outer surface forming an inner bearing race surface 20. The inner race surface 20 is preferably substantially spheroidal and has (FIG. 2) a radius of curvature $R_i$. If desired, collars (not shown) can be secured on the opposite ends of the inner ring member 18 to provide misalignment stops and a surface for a seal to engage. A bearing apparatus including suitable collars is illustrated in aforementioned U.S. Pat. No. 2,767,037, the specification of which is herein incorporated by reference.

The roller bearing 10 also comprises an annular outer race or ring member 22 encircling the inner ring member 18. The outer ring member 22 includes at least one radially inwardly facing outer race surface. In the illustrated arrangement, the outer ring member 22 includes a pair of axially oppositely inclined arcuate outer race surfaces 24 each opposing the inner race surface 20 to provide a pair of raceway spaces 26. The outer race surfaces 24 are of generally convex curvature and each has (FIG. 2) a radius of curvature $R_o$ that is preferably substantially constant. The value of radius of curvature $R_o$ for both outer race surfaces 24 is preferably the same (within manufacturing tolerances) and, in the illustrated embodiment, is approximately equal to radius of curvature $R_i$.

To facilitate periodic lubrication of the bearing apparatus 10, an annular groove 28 is provided on the outer circumferential side of the outer ring member 22 and a hole 30 communicates between the groove 28 and the interior of the bearing apparatus 10. A desired lubricant can be injected into the groove 28 by suitable means such as a grease gun (not shown), as is described in U.S. Pat. No. 2,767,037. For reasons explained hereinafter, the outer ring member 22 also includes notches 32 on its opposite axial sides.

The roller bearing 10 also comprises a plurality of rollers 34. In the illustrated embodiment, the rollers 34 are arranged in the raceway spaces 26 in oppositely axially inclined annular rows. Each row includes up to a full complement of rollers 34 (i.e., maximum number of rollers that will fit in a row when no retainer or other structure intervenes between adjacent rollers). Since the bearing apparatus 10 is retainerless, as is further discussed below, each roller 34 is engageable with the adjacent rollers on its opposite sides, as well as with the inner race surface 20 and the associated one of the outer race surfaces 24. While the rollers 34 can have various configurations, in the illustrated arrangement the rollers 34 are identical (within manufacturing tolerances), and each roller 34 has (FIG. 2) a longitudinal axis 36 and is symmetric about a plane which is perpendicular to the axis 36 and which includes a line 38 at the midpoint of the roller 34.

As shown in FIG. 2, each roller 34 includes a midsection 40 with an arcuate outer surface having a concave longitudinal profile with a radius of curvature $R_r$ that is preferably constant. In the particular embodiment illustrated in the drawings, radius of curvature $R_r$ is greater than each of the radii $R_i$ and $R_o$. Each roller 34 also has opposite end portions 42 that are substantially cylindrical.

Since the bearing apparatus 10 includes no retainer, guide ring, collars, etc., the inner race surface 20 and the outer race surfaces 24 serve as the sole means for holding and positioning the rollers 34 of each row within the corresponding raceway space 26 of the unit. Additionally, since the inner race surface 20 is spheroidal and $R_i$ is less than $R_r$, sliding movement between the rollers 34 and the inner race surface 20 is substantially eliminated and pivotal movement of each roller 34 about its midpoint line 38 is at most minimally interfered with by the inner race surface 20. Therefore, such pivotal movement (i.e., skewing) is controlled substantially entirely by contact between the rollers 34 and the associated outer race surfaces 24. Applicant has discovered that in the illustrated embodiment the cooperation of the rollers 34 with the outer race surfaces 24 is adequate to provide the sole means for controlling roller skew.

In particular, under no load conditions (FIG. 3), substantially point contact exists between each of the rollers 34 and the associated outer race surface 24. Any pivotal movement by a roller 34 about its midpoint line 38 (skewing) results in development of a line of contact (see FIG. 2) between that roller and the associated outer race surface 24 which inhibits further skewing. If roller skew continues to increase the line of contact eventually reaches the end portions 42 of the hourglass-shaped rollers, which ends restrict any further skewing. Under loaded conditions, contact between the roller 34 and the associated outer race surface 24 and the inner race surface 20 is extended axially outwardly from the midpoint of the roller 34 due to material deflection as well as roller skewing. Although the effects of that relationship are not fully understood, it has been observed that substantial indexing or precessing of the rollers 34 is achieved when the bearing apparatus 10 is used in oscillatory applications. Additionally, tests have indicated substantial increases in load rating and bearing life as measured by cycles to failure relative to prior art bearings including retainers, this being primarily due to the increased number of rollers 34 over which the load is distributed.

In one particular embodiment of the invention, for example, a full complement of sixteen rollers 34 each having a diameter (in end view) of about 0.4 inch are used in each row, although fewer rollers 34 could be used to accommodate additional lubricant, if desired. In that embodiment, $R_r$ is about 1.536 inches and about 0.015 inch greater than each of $R_i$ and $R_o$ (i.e., about 1% osculation or difference in curvature between the rollers and the inner and outer race surfaces). While optimum osculation values are not known, 1% osculation is effective to achieve acceptable roller control and guidance, and Applicant believes that osculation values up to about 4% may be employed.

While in the illustrated embodiment the rollers 34 are hourglass-shaped, the outer race surfaces 24 are convex and the inner race surface 20 is spheroidal, in other arrangements the bearing apparatus 10 can have different configurations. For example, a bearing apparatus in accordance with the invention could include barrel-shaped rollers and the inner and outer race surfaces could each be concave to accommodate the barrel-shaped rollers and to hold those rollers in position without the use of a retainer, guide ring, or the like.

The bearing apparatus 10 also includes means for containing lubricant and for preventing contaminants from entering the raceway spaces 26. In the illustrated arrangement such means includes annular shield members 44 each seated in one of the notches 32, and an annular seal member 46 mounted in each of the shield members 44.

Advantageously, the bearing apparatus 10 includes nothing to guide or position the rollers 34 and to control roller skewing within acceptable levels other than the primary inner and outer race surfaces 20 and 24 (i.e., the bearing apparatus 10 is "retainerless"). Thus, the bearing apparatus 10 avoids the cost associated with retainers, guide rings, collars, and the like. Further, the bearing apparatus 10 avoids the use of internal corners associated with the primary race surfaces which is an advantage particularly in operating conditions including particulate contamination. The bearing apparatus 10 also includes an increased number of rollers 34 and/or additional lubricant to improve performance, and has the ability to precess or index.

Other features and advantages of the invention are set forth in the following claims.

I claim:

1. A roller bearing apparatus comprising
   an inner ring member including an arcuate inner race surface having a radius of curvature,
   an outer ring member encircling the inner ring member and including an arcuate outer race surface opposing the arcuate inner race surface, the arcuate outer race surface being convex, the arcuate outer race surface having a radius of curvature, and the arcuate inner and outer race surfaces defining therebetween a raceway space,
   a plurality of rollers including an axially inclined row of rollers in the raceway space, each of the rollers in the row being engageable with adjacent ones of the rollers in the row, and each of the rollers in the row including a concave longitudinal profile and a radius of curvature, the radius of curvature of each of the rollers in the row being greater than the radius of curvature of each of the arcuate inner and outer race surfaces, and
   means for limiting skew of the rollers in the row and for positioning and holding the rollers in the row within the raceway space, said means for limiting skew of the rollers and for positioning and holding the rollers including only the arcuate inner and outer race surfaces.

2. A roller bearing apparatus as set forth in claim 1 wherein the arcuate inner race surface forms a portion of a sphere, wherein the radius of curvature of the arcuate outer race surface is constant, and wherein the radius of curvature of each of the rollers is constant.

3. A roller bearing apparatus as set forth in claim 2 wherein the row of rollers includes a full complement of rollers.

4. A retainerless self-aligning roller bearing apparatus comprising
   an inner ring member including an arcuate inner race surface,
   an outer ring member encircling the inner ring member and including a first convex outer race surface opposing the inner race surface, the first convex outer race surface including a radius of curvature, and the arcuate inner race surface and the first convex outer race surface defining therebetween a first raceway space,
   a plurality of rollers including a first row of rollers in the first raceway space, each of the rollers in the first raceway space being engageable with adjacent ones of the rollers on its opposite sides, and each of the rollers in the first raceway space including a concave longitudinal profile having a radius of curvature greater than the radius of curvature of the first convex outer race surface, and
   means for positioning and holding the rollers in the first row of rollers within the bearing apparatus, said means for positioning and holding the rollers in the first row of rollers including only the arcuate inner race surface and the first convex outer race surface.

5. A retainerless self-aligning roller bearing apparatus as set forth in claim 4 wherein the arcuate inner race surface includes a radius of curvature less than the radius of curvature of each of the rollers in the first row of rollers.

6. A retainerless self-aligning roller bearing apparatus as set forth in claim 5 wherein the radius of curvature of the arcuate inner race surface is constant so that the arcuate inner race surface forms part of a sphere, wherein the radius of curvature of the first convex outer race surface is constant, and wherein each of the rollers is symmetrical, and the radius of curvature of each of the rollers in the first row of rollers is constant.

7. A retainerless self-aligning roller bearing apparatus as set forth in claim 4 wherein the bearing apparatus includes means for limiting skew of the rollers in the first row of rollers, said means for limiting skew of the rollers in the first row including only the first convex outer race surface.

8. A retainerless self-aligning bearing apparatus as set forth in claim 4 wherein the outer ring member includes a second convex outer race surface, the second convex outer race surface opposing the arcuate inner race surface to define therebetween a second raceway space, the second convex outer race surface including a radius of curvature, and the first and second convex outer race surfaces being oppositely axially inclined, wherein the plurality of rollers includes a second row of rollers in the second raceway space, each of the rollers in the second row of rollers being engageable with adjacent ones of the rollers in that row, and each of the rollers in the second row of rollers including a concave longitudinal profile having a radius of curvature greater than each of the radius of curvature of the arcuate inner race surface and the radius of curvature of the second convex outer race surface, wherein the radius of curvature of each of the rollers is constant, wherein each of the rollers includes a midpoint and is symmetrical about its midpoint, and wherein the first and second rows of rollers are oppositely axially inclined, and each of the first and second rows of rollers includes a full complement of rollers.

9. A self-aligning bearing apparatus comprising
an inner ring member including an arcuate inner race surface, the arcuate inner race surface forming a portion of a sphere having a radius of curvature,
an outer ring member encircling the inner ring member, the outer ring member including a pair of oppositely axially inclined convex outer race surfaces opposing the inner race surface to form a pair of raceway spaces, each of the convex outer race surfaces including a constant radius of curvature,
a plurality of rollers arranged in oppositely axially inclined rows, each of the rows including a full complement of the rollers, each of the rows occupying one of the raceway spaces, each of the rollers engaging the arcuate inner race surface and an associated one of the convex outer race surfaces, each of the rollers including a midpoint and being symmetrical about its midpoint, and each of the rollers including a concave longitudinal profile having a constant radius of curvature greater than each of the radius of curvature of the arcuate inner race surface and the radius of curvature of the associated one of the convex outer race surfaces, and
means for positioning and holding each of the rollers within the bearing apparatus, said means for positioning and holding including only the arcuate inner race surface the pair of convex outer race surfaces.

10. A self-aligning bearing apparatus as set forth in claim 9 wherein the bearing apparatus includes means for limiting roller skew, said means for limiting roller skew including only the convex outer race surfaces.

11. A roller bearing apparatus comprising
an inner ring member including an arcuate inner race surface, the arcuate inner race surface including a radius of curvature,
an outer ring member encircling the inner ring member and including an arcuate first outer race surface opposing the arcuate inner race surface, the arcuate inner and first outer race surfaces defining therebetween a first raceway space, and the outer ring member including an arcuate second outer race surface opposing the arcuate inner race surface, the arcuate inner and second outer race surfaces defining therebetween a second raceway space, the arcuate first and second outer race surfaces being oppositely axially inclined, each of the arcuate first and second outer race surfaces being convex, and each of the arcuate first and second outer race surfaces including a radius of curvature,
a plurality of rollers including an axially inclined first row of rollers in the first raceway space, each of the rollers in the first row being engageable with adjacent ones of the rollers in the first row, and each of the rollers in the first row engaging the arcuate first outer race surface, and the plurality of rollers including a second row of rollers, the second row of rollers being positioned in the+second raceway space, and each of the rollers in the second row engaging the arcuate second outer race surface, each of the rollers in the first and second rows of rollers including a midpoint and being symmetrical about its midpoint, each of the rollers in the first and second rows including a concave longitudinal profile, and each of the rollers in the first and second rows including an arcuate outer surface having a radius of curvature which is greater than the radius of curvature of the arcuate inner race surface and which is greater than the radius of curvature of the one of the arcuate first and second outer race surfaces with which said roller is engaged,
means for limiting skew of the rollers in the first row and for positioning and holding the rollers in the first row within the raceway space, the means for limiting skew of the rollers in the first row and for positioning and holding the rollers in the first row including only the arcuate inner and first outer race surfaces, and
means for limiting skew of the rollers in the second row and for positioning and holding the rollers in the second row within the second raceway space, the means for limiting skew of the rollers in the second row and for positioning and holding the rollers in the second row including only the arcuate inner and second outer race surfaces.

* * * * *